(12) United States Patent
Chavez Rico et al.

(10) Patent No.: US 10,465,495 B2
(45) Date of Patent: Nov. 5, 2019

(54) POLISHED-ROD THERMAL IMAGING SYSTEM FOR PREVENTING FAILURES IN THE OPERATION OF A SUCKER ROD PUMP

(71) Applicant: Petrolog Automation Inc., Odessa, TX (US)

(72) Inventors: Cesar Augusto Chavez Rico, Chihuahua (MX); Carlos Andree Labrado Mendias, Chihuahua (MX)

(73) Assignee: Petrolog Automation, Inc, Odessa, TX (US)

( * ) Notice: Subject to any disclaimer, the term of this patent is extended or adjusted under 35 U.S.C. 154(b) by 0 days.

(21) Appl. No.: 15/722,060

(22) Filed: Oct. 2, 2017

(65) Prior Publication Data

US 2019/0100990 A1 Apr. 4, 2019

(51) Int. Cl.
*E21B 47/00* (2012.01)
*G01J 5/00* (2006.01)
*G01J 5/10* (2006.01)
*G01B 11/00* (2006.01)
*H04N 5/33* (2006.01)
(Continued)

(52) U.S. Cl.
CPC ...... *E21B 47/0008* (2013.01); *E21B 47/0002* (2013.01); *G01B 11/002* (2013.01); *G01J 5/0003* (2013.01); *G01J 5/10* (2013.01); *G06T 7/0006* (2013.01); *G06T 7/12* (2017.01); *G06T 7/13* (2017.01); *G06T 7/174* (2017.01); *G06T 7/73* (2017.01); *G06T 7/74* (2017.01); *H04N 5/33* (2013.01); *E21B 43/127* (2013.01); *G01J 2005/0077* (2013.01); *G01V 8/00* (2013.01); *G06T 2207/10016* (2013.01); *G06T 2207/10048* (2013.01); *G06T 2207/20081* (2013.01); *G06T 2207/30136* (2013.01); *G06T 2207/30164* (2013.01); *G06T 2207/30181* (2013.01)

(58) Field of Classification Search
None
See application file for complete search history.

(56) References Cited

U.S. PATENT DOCUMENTS 4,490,094 A * 12/1984 Gibbs ............... F04B 47/02
417/42
5,477,850 A * 12/1995 Zegler ............... A62B 17/008
128/202.11

(Continued)

*Primary Examiner* — Mohammad J Rahman
(74) *Attorney, Agent, or Firm* — Defillo & Associates, Inc.; Evelyn A Defilló

(57) ABSTRACT

A device for detecting temperatures of a rod on a well having a housing; a clamp to secure the housing to a post of the well; a thermal radiation sensor secured to the front end of the housing; a visual radiation sensor secured to the front end of the housing, the visual radiation sensor is vertically aligned with the thermal radiation sensor; a microcontroller system placed inside housing, the microcontroller system includes a microcontroller, a non-volatile memory, and a serial interface in electronic communication; a position device placed inside the housing; a wireless device placed inside the housing; output device placed in the interior cavity of the housing; the microcontroller is in electronic communication with the serial interface for communicating with the visible radiation sensor, the thermal radiation sensor, the output module, the wireless module, and the position module.

7 Claims, 8 Drawing Sheets

(51) Int. Cl.
  *G06T 7/73* (2017.01)
  *G06T 7/13* (2017.01)
  *G06T 7/00* (2017.01)
  *G06T 7/12* (2017.01)
  *G06T 7/174* (2017.01)
  *E21B 43/12* (2006.01)
  *G01V 8/00* (2006.01)

(56) References Cited

U.S. PATENT DOCUMENTS

| | | | | |
|---|---|---|---|---|
| 5,585,631 | A * | 12/1996 | Deguchi | G08B 13/191 250/332 |
| 5,622,371 | A * | 4/1997 | Angelo | F16J 15/184 277/329 |
| 6,406,180 | B1 * | 6/2002 | Walker | G01N 25/56 165/11.1 |
| 6,513,593 | B2 * | 2/2003 | Prasad | E21B 17/00 166/242.6 |
| 7,513,752 | B2 * | 4/2009 | Boone | E21B 47/0008 166/250.1 |
| 9,476,775 | B2 * | 10/2016 | Sparks | G01K 1/12 |
| 9,939,164 | B2 * | 4/2018 | Kusukame | B60H 1/00742 |
| 10,125,582 | B1 * | 11/2018 | Johnson | E21B 43/121 |
| 2002/0157832 | A1 * | 10/2002 | Prasad | E21B 17/00 166/304 |
| 2004/0139149 | A1 * | 7/2004 | De Sousa | H04W 4/18 709/200 |
| 2004/0206405 | A1 * | 10/2004 | Smith | E03B 7/071 137/624.12 |
| 2004/0223533 | A1 * | 11/2004 | Dishaw | E21B 19/165 374/4 |
| 2006/0108349 | A1 * | 5/2006 | Finley | H02K 15/165 219/469 |
| 2007/0288193 | A1 * | 12/2007 | Lima | G01N 25/44 702/136 |
| 2008/0125701 | A1 * | 5/2008 | Moberg | A61B 5/1118 604/67 |
| 2011/0275891 | A1 * | 11/2011 | Shemi | A61M 31/007 600/104 |
| 2013/0083199 | A1 * | 4/2013 | Choi | H04N 5/332 348/164 |
| 2015/0090049 | A1 * | 4/2015 | Kertesz | H01M 2/1022 73/861.18 |
| 2015/0148919 | A1 * | 5/2015 | Watson | G06N 7/005 700/31 |
| 2016/0237804 | A1 * | 8/2016 | Papadimitriou | E21B 47/0006 |
| 2017/0169299 | A1 * | 6/2017 | Huang | G06K 9/00785 |
| 2017/0234761 | A1 * | 8/2017 | Augusto | G01M 3/38 250/338.5 |
| 2017/0329311 | A1 * | 11/2017 | Al Assad | E21B 43/127 |
| 2018/0007226 | A1 * | 1/2018 | Holland | H04N 1/2133 |
| 2018/0361379 | A1 * | 12/2018 | Biro | B01L 7/52 |

* cited by examiner

POLISHED-ROD THERMAL IMAGING SYSTEM FOR PREVENTING FAILURES IN THE OPERATION OF A SUCKER ROD PUMP

FIELD OF INVENTION

The present invention relates to the general field of hydrocarbons production. More specifically, the present invention relates to a system that prevents failures in the operation of a sucker rod pump.

BACKGROUND OF THE INVENTION

Hydrocarbons are often produced from well bores by sucker rod pumps. Beam pumping, or the sucker-rod lift method, is the oldest and most widely used type of artificial lift for most wells. A sucker-rod pumping system is made up of several components, some of which operate aboveground and other parts of which operate underground, down in the well. The surface-pumping unit, which drives the underground pump, consists of a prime mover (usually an electric motor) and, normally, a beam fixed to a pivotal post. The post is called a Sampson post, and the beam is normally called a walking beam. This system allows the beam to rock back and forth, moving the downhole components up and down in the process. The entire surface system is run by a prime mover, V-belt drives, and a gearbox with a crank mechanism on it. Linked rods attached to an underground pump are connected to the surface unit. The linked rods are normally called sucker rods and are usually long steel rods, from ⅝ to more than 1 or 1¼ in. in diameter. The steel rods are normally screwed together in 25- or 30-ft lengths to become a continuous length from the surface to the downhole pump. The steel sucker rods typically fit inside the tubing and are stroked up and down by the surface-pumping unit. This activates the downhole, positive-displacement pump at the bottom of the well. Each time the rods and pumps are stroked, a volume of produced fluid is lifted through the sucker-rod tubing annulus and discharged at the surface.

A polished rod is the top-most rod in a rod string, this polished rod, as the other rods in the string is subject to the movement generated by the reciprocating walking beam, but different to the other rods and due to its position at the surface, the polished rod will slide in and out of the tubing via a stuffing box that forms a tight seal with the polished rod and diverting the produced fluids out of the pumping tee into the flow line. As the only part of the rod string in direct contact with the ambient during the normal operation of the artificial lift unit, it has become one of the ways well operators determine the status of a artificial lift system. By manually gauging the temperature of the polished rod during normal operation of the system, a well operator can infer or detect issues such as:

Excessive tightness of the sealing gland.
Lack of well fluid at the top of the well.
Pump off conditions.
Polished rod alignment.

All the above mentioned conditions cause strain, wearing and eventually an increase of temperature in the stuffing box sealing gland that divert the produced fluids out of the pumping tee into the flowline. If the root cause of the problem causing a temperature increase in the polished rod is not identified and corrected, and once the sealing gland is damaged, the production fluids will escape out of the pumping tee.

The current methods to gauge the polished rod temperature vary from manually touching the rod and approximate the temperature by feeling the heat emanated by it to a lapsed patent (U.S. Pat. No. 4,672,845) of a complicated housing with temperature sensors fixed to the stuffing box. These methods are, in general inaccurate and in particular:
A. Manual sensing:
   a. Unsafe conditions associated with:
      i. Possible high temperature of the polished rod>200☐.
      ii. Physical contact with moving parts during operation.
   b. Logistics:
      i. Well operator has to be present to detect issues.
      ii. Manpower and vehicles operating costs.
B. Contact autonomous sensing. Depending on the position in which the contact sensor is located, to different and undesirable effects will occur:
   a. "Average" readings: As the polished rod is moving in and out of the stuffing box, if the sensor is statically located on top of said box the reading will be an average of the temperature in the rod. This average will be affected by the speed of the well and the reaction time of the sensor.
   b. "Section" readings: If the sensor is installed in a way that moves with the polished rod it will have to be installed on the very top part of it, limiting the temperature reading to that particular section of the rod.

For at least the foregoing reasons, there remains a need for an apparatus that is easily installed and can:
1. Detect the temperature of several points of the polished rod at the same time.
2. Automatically identify the pumping tee and the polished rod.
3. Stop the well operation automatically in the case of an alarm condition.
4. Notify the well operator if an alarm condition is found.
5. Provided remote data collection, visualization and operation.

SUMMARY OF THE INVENTION

The present invention provides new and improved method, apparatus, and system for detecting the temperature of different points of the polished rod and using said temperature points to determine monitor and/or control actions of a sucker rod pump that satisfies the aforementioned needs and more.

According to one embodiment of the present invention, there is provided a method to accurately sense the temperature of different parts of the polished rod, all at the same moment in time, by the means of a thermal camera. The method also gathering data from a visible light camera, and the correlation of the gathered data by a high performance microcontroller to accurately assign temperature values to sections of interest in the visible image (polished rod).

According to another embodiment of the present invention, there is provided an apparatus for gathering processing and correlating the thermal and visible light images.

An apparatus having features of the present invention has a high performance microcontroller module having, in electronic communication, a microcontroller, a non-volatile memory, one or more actuators for sending control signals, and at least one thermal imaging sensor and one visible light sensor. The apparatus is capable of mounting to any section of the Samson Post, for example by attachment with a pair of C-clamps in such a way that both image and thermal sensors point in the relative direction of the polished rod. The outputs of the thermal imaging sensor and the visible light sensor are connected to the serial ports of the microcontroller module and the non-volatile memory of the microcontroller module contains software for running by the microcontroller to gather, process and correlate the sensor data and operate the actuators. The apparatus further comprises a wireless module for communication of data and instructions between the microcontroller module and a remote wireless device.

According to yet another embodiment of the present invention there is provided a system for detecting the temperature of different points of the polished rod and using said temperature points to determine monitor and/or control actions. A system having features of the present invention has an apparatus according the present invention in which the non-volatile memory contains software that, when executed, instructs the microcontroller to collect a thermal image and a visible light image at the moment in which the pump jack is at the top of the pump cycle, process and correlate both images and sends the processed data to yet another software that, when executed will compare the different temperature values in the different parts of the polished rod to a set of predefined constants and determine the current pumping conditions to execute any appropriate control actions and alarm conditions. Once this determination is concluded the data is sent to yet another software that stores relevant information in non-volatile memory and sends said data, through a wireless link to a predefined server and/or local wireless-equipped device.

It is therefore an object of the present invention to provide a method, apparatus, and system for using the temperature of different points of the polished rod to monitor and/or control a sucker rod pump, which do not suffer from the prior art drawbacks.

It is a further object of the present invention to provide for method, apparatus, and systems that can automatically identify objects of interest via image recognition algorithms.

It is a further object of the present invention to provide for method, apparatus, and systems that can be easily installed and operated with the minimum of calibration and operator intervention.

It is yet a further object of the present invention to provide for method, apparatus, and systems for remote data collection from polished rod temperatures and pump jack conditions for the collection of historic and/or real time operational data from a well, and for the graphical display of the data such as a polished rod temperatures, on a remote device such as a wireless-equipped handheld computer, server or internet enabled device.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions—as Used Herein

A. Microcontroller—Refers without limitation to any microprocessor design that preferably emphasizes high integration, low power consumption, self-sufficiency and image processing capabilities. Exemplary microcontrollers include ARM architecture from TI, Samsung and other and the 8051 architecture from Atmel, Intel and other. It will be understood that the term encompasses the use of microprocessors such as are found within personal computers and the like now known or later developed for processing of data and images within the scope of the apparatus and system of the present invention.

B. Non-Volatile Memory—Flash RAM, SD card, optical hard drive, EEPROM, or any other memory device now known or later developed for the storage of programs or data that are not lost when the microcontroller module is powered down or power is not available for the normal operation of the microcontroller.

C. Long Wave Infrared Radiation—Electromagnetic radiation with longer wavelengths than those of visible light, and is therefore invisible, although it is sometimes loosely called infrared light. It extends from the nominal red edge of the visible spectrum at 700 nanometers to 1000000 nanometers.

D. Visible Light Radiation—Refers to visible light, which is visible to the human eye and is responsible for the sense of sight. Visible light is defined as having wavelengths in the range of 400-700 nanometers, between the infrared (with longer wavelengths) and the ultraviolet (with shorter wavelengths). This wavelength means a frequency range of roughly 430-750 terahertz.

E. Radiation Sensor—Refers without limitation to any sensor capable of transforming radiation in different spectrum to data that can be interpreted by a microcontroller. Exemplary radiation sensors include and it's not limited to digital cameras like Raspberry Pi Camera Module and thermal cameras like Flir Lepton. It will be understood that the term encompasses the use of sensors such as are found within digital cameras and the like now known or later developed for gathering radiation data.

F. Polished Rod 308—The top-most rod in a rod string of a reciprocating well that slide in and out of the tubing via a stuffing box.

G. Stuffing Box 310—Mechanical contraption at the surface of a reciprocating well that forms a tight seal with the polished rod 308 and diverts the produced fluids out of the pumping tee and into the flowline.

H. Samson Post 312—Mechanical structure that vertically supports the walking beam 316 of a reciprocating well.

I. Walking Beam 316—Mechanical structure that is the horizontal load-bearing element of a reciprocating well.

J. Wellhead 314—Mechanical structure that is the element where rod string via the polished rod is attached to the walking beam 316 of a reciprocating well.

K. IoT—Internet of things. communication protocol stack that allows for a client-server architecture leveraging well-known technology applied mainly on the internet.

L. MQTT—Message Queue Telemetry Transport is an ISO standard (ISO/IEC PRF 20922) publish-subscribe-based "lightweight" messaging protocol for use on top of the TCP/IP protocol.

M. Artificial Intelligence—The theory and development of computer systems able to perform tasks that normally require human intelligence, such as visual perception N. Stroke—The full cycle of a reciprocating well from going from an arbitrary point to returning to that same point.

DESCRIPTION

Figure 1:
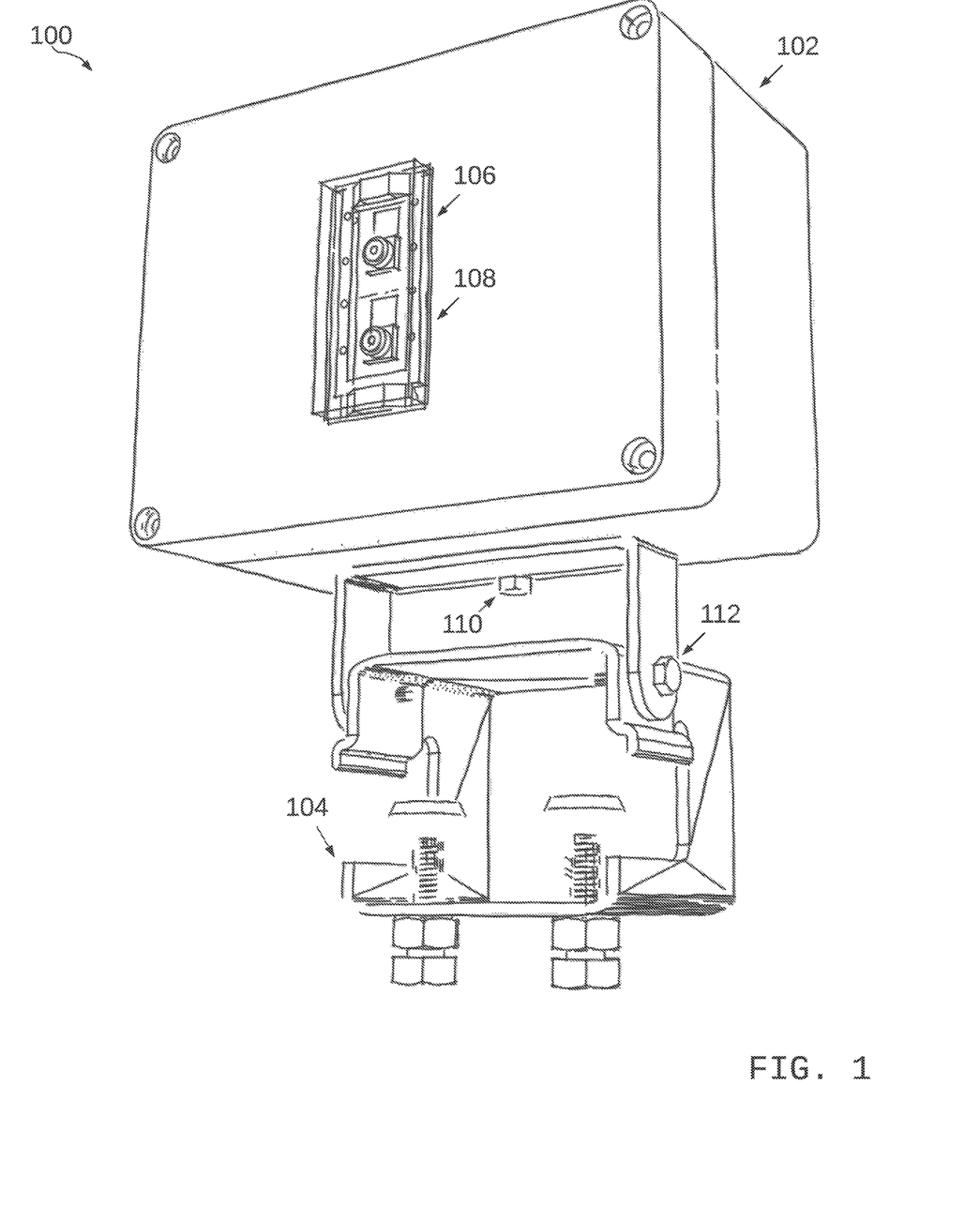
FIG. 1 illustrates is a perspective front view of one embodiment of an apparatus according to the present invention.

Referring to FIG. 1 illustrates the mechanical device 100 of according to an embodiment of the invention. The device 100 includes a housing 102. The housing 102 may be of any size. For example, the housing 102 may have the following dimensions: of 6.2 wide by 4.7 tall by 3.6 inches deep. The housing 102 encloses the electronics system 200 and sensors 106, 108. The enclosure can be made out of cast aluminum or polycarbonate.

Figure 3:
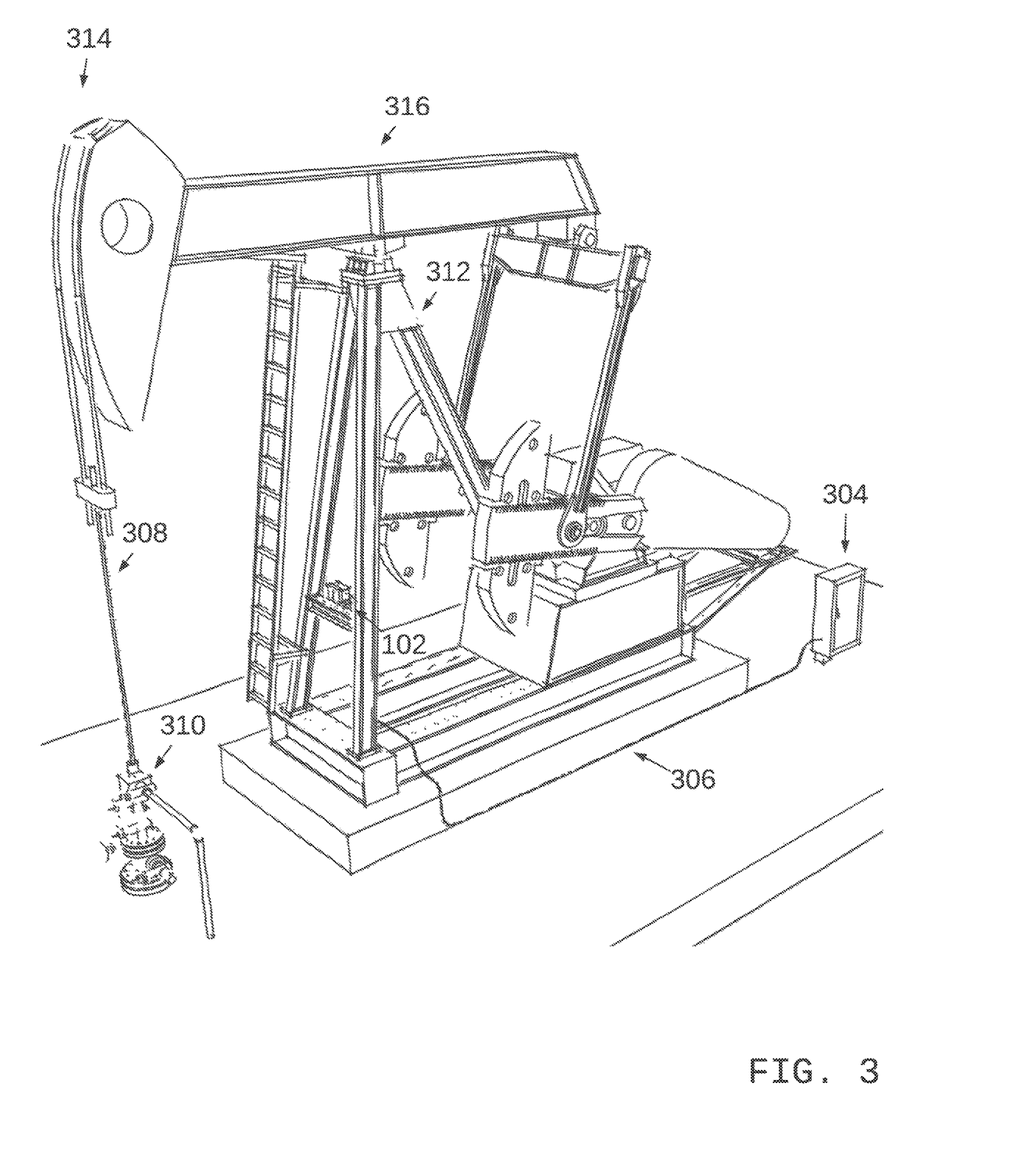
FIG. 3 illustrates a perspective front view of the apparatus according to the present invention mounted to a sucker rod pump.

The housing 102 is attached to a C-clamp 104 to secure to the samson post 312 of a reciprocating well (See FIG. 3). The C-clamp 104 has bolts to adjust the direction of the thermal radiation sensor 106 and a visual radiation sensor 108 located in the vertical axis and horizontal axis respectively.

The mechanical device 100 provides a reliable and secure positioning for the thermal radiation sensors 106, the visible radiation sensor 108, and electronics on the device 100 and at the same time it will be easy to install, point and calibrate to a direct line of sight of stuffing box 310 and polished rod 308. See FIG. 3.

Figure 2:
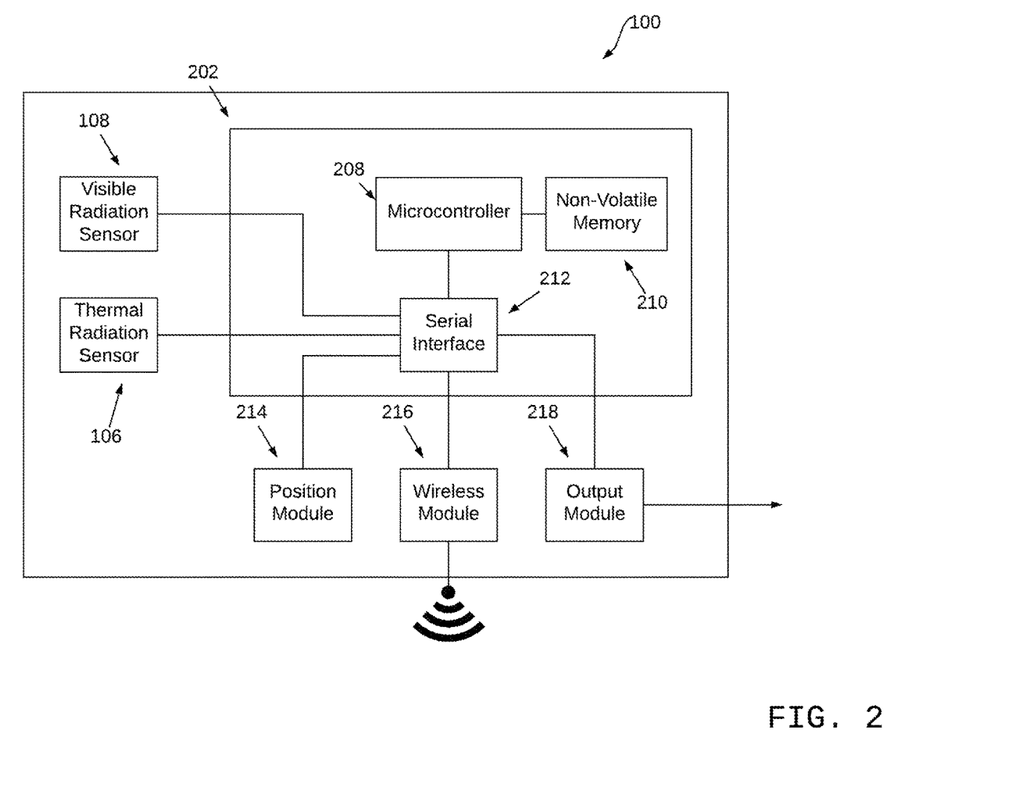
FIG. 2 illustrates a block diagram of the component parts of one embodiment of an apparatus according to the present invention.

Referring now to FIG. 2, there is shown a schematic representation of an the device 100 according to an embodiment of the present invention. The device 100 includes a microcontroller system 202, a thermal radiation sensor 106, a visible radiation sensor 108, a position device 214, a wireless device 216, and output device 218.

Microcontroller system 202 comprises a microcontroller 208, a non-volatile memory 210, and serial interface 212 in electronic communication. The microcontroller 208 is further in electronic communication with a serial interface 212 for communicating with one visible radiation sensor 108, a thermal radiation sensor 106, one or more output modules 218, a wireless module 216, and a position module 214.

The visible radiation sensor 108 comprises a sensitive medium that converts radiation in the visible spectrum to an electronic signal proportional to the radiation level. This signals are then transformed to a map of radiation levels that can be interpreted by a microcontroller 208. Exemplary visible radiation sensors include and it's not limited to digital cameras like Raspberry Pi Camera Module.

The thermal radiation sensor 106 comprises a sensitive medium that can convert radiation in the infrared spectrum to an electronic signal proportional to the radiation level. This signals are then transformed to a map of radiation levels that can be interpreted by a microcontroller. Exemplary thermal radiation sensors include and it's not limited to digital thermal cameras like Flir Lepton.

The thermal 106 and visible 108 radiation sensors are mounted to the front of the housing 102 and centered horizontally in a manner that permits the correlation of the images 410 acquired 406, 408 to be performed using this horizontal central point as a reference for the correlation. This horizontal correlation 410 allows the use visible image to precisely identify the polished rod and assign radiation values to the corresponding position in the thermal image.

Position device 214 comprises electronics to infer the position of the device 100 relative to the samson post, wellhead, and polished rod. The position device 214 includes, but is not limited to, an accelerometer to detect the gravity pull in three axis and converts the pull into an electronic signal that is proportional to the pull in any given axis. The accelerometer information correlated with the visible image will allow for a precise detection of the well head position 404. Exemplary accelerometer sensors include and it's not limited to devices like Adafruit Triple-Axis Accelerometer—±2/4/8 g @ 14-bit-MMA8451.

Wireless device 216 comprises electronics and an antennae for long-range wireless communication, short-range wireless communication, or both. Examples of short range wireless protocols include Bluetooth and 802.11 communication protocols. Examples of long-range wireless protocols include IoT protocols such as MQTT. The wireless communication permits bi-directional communication with a remote server 418 to send monitoring data 414, send alarm data 422, and receive all data required for determining pumping conditions 420 to and from the apparatus. For example, a handheld computer or smart-phone can retrieve the operating record of the pump over an extended period of time, or can retrieve a real-time visible images and thermal images of the polished rod 308 and stuffing box 310.

Output device 218 comprises electronic actuators, such as for example high current relays, for controlling operation of the prime mover of the reciprocating wells.

It should be understood that, although microcontroller device 202, sensors 106, 108, position device 214, wireless device 216, and output device 218 are shown within one housing 102 in FIG. 1, FIG. 2 and FIG. 3, any or all modules can be separated into unique physical units. Likewise, the components of any one module can be separated into two or more physical units.

Referring now to FIG. 3 there is shown the mounting of the enclosure 102 in a section of the samson post 312 that has an unobstructed line of sight of the polished rod 308 by a C-clamp structure 104 that allows fine tuning of the direction of the sensors 106, 108 horizontally, nut 110 and vertically, nut 112. Also it is shown a wire 306 running from the starter box 304 to the enclosure 102. The purpose of the wire 306 is to provide power to the electronic of the device 100 and to take the signal of the output module 218 to stop the well in the case that the pumping conditions are determined 420 to be inadequate based on user 416 inputs and server 418 machine learning data.

Figure 4:
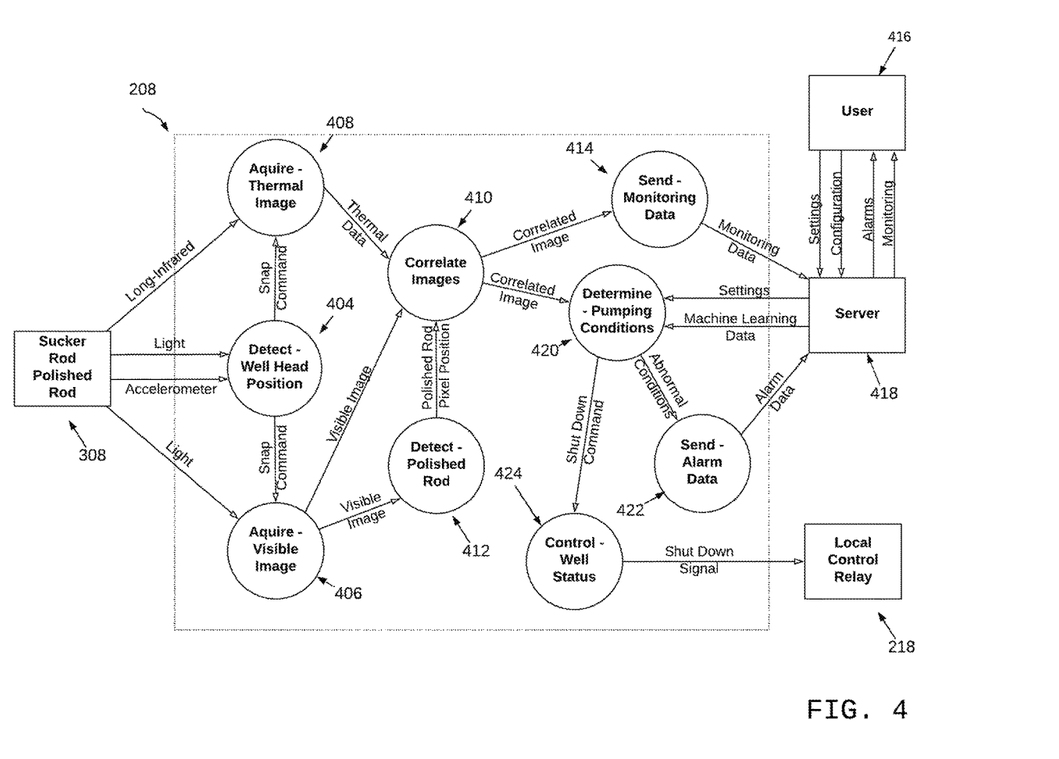
FIG. 4 illustrates a flow diagram showing a method for detecting the temperature of different points of the polished rod and using said temperature points to determine monitor and/or control actions of a sucker rod pump according to an embodiment of the present invention.

Referring now to FIG. 4 illustrates a the way information passes between the different parts that conform the software that is executed by the microcontroller 208 in an embodiment of the invention. One part of this software resides inside the non-volatile memory 210 for the microcontroller at the well location while other resides in a server at a remote location 418. In an embodiment of the invention, the position and radiation data are captured from the polished rod 308 and transferred to a section of the software 404 that is responsible of detecting the wellhead 314. This section is able to identify the precise moment 520 where the wellhead 314 is at the topmost position and therefore the complete section of the polished rod 308 will be out of the stuffing box 310. At this moment a data signal is sent to sections of the software 408, 406 responsible of making both the thermal sensor 106 and the visual sensor 108 to trigger their acquisition mechanisms. The readings are then passed as data to a different section of the software to correlate 410 both images horizontally. This horizontal correlation 410 allows to use the visible image to precisely identify the polished rod 308 and assign radiation values to the corresponding position in the thermal image. The correlated image data is then sent to a yet another section of the software 420 that is able to determine pumping conditions, the determination is based on user inputs 416 and remote server 418 learning data. The horizontal correlation 410 data is also transferred to a software section 414 that will send it to a remote server 418 as monitoring data.

The result of the pumping condition determination is made by yet another software section 420 and is then used as input to a another section of the software 422 that will communicate with the wireless module 216 to send an alarm to the remote monitoring server 418 if the pumping conditions are inadequate. Yet another section of software 424 will use the output of the pumping condition determination 420 to send a signal to a local control relay 218 to turn the pumping unit off it the pumping conditions are inadequate.

Figure 5:
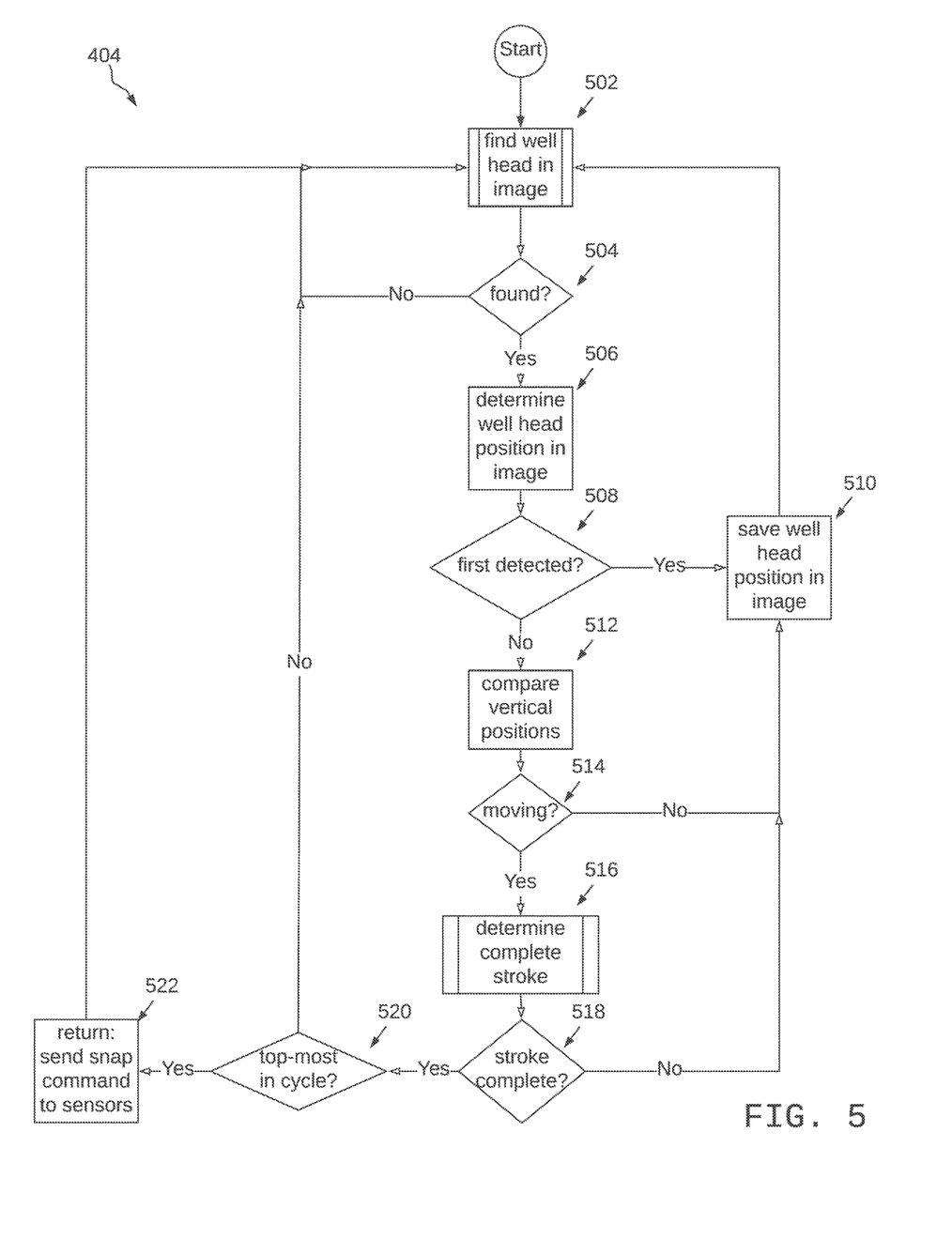
FIG. 5 illustrates a flow diagram showing an operation of a system for sensing the current position of the well head in a sucker rod pump according to an embodiment of the present invention.

The present invention provides a method implemented in a section of the software 404 residing in non-volatile memory 210 and executed by the microcontroller 208 that describes the steps and decisions to accurately determine the position of the wellhead 314. The first step in this process 502 will determine if an image contains 504 a section of the wellhead 314. If the process does not find the wellhead 314 or a section of it another image will be analyzed. If process returns a successful find the next step is to determine the location in the image in which the wellhead is located 506. The above process need to complete successfully at least two times 508 in order to be able to compare the vertical positions 512. Via this comparison another determination needs to occur to verify the well movement 514, all this information is needed to determine 516 if a complete stroke happened 518. Once the determination is done the current position will be compared to the determine if it is the top-most in the cycle 520 if it is then the command to gather the thermal sensing data is sent 522.

Figure 6:
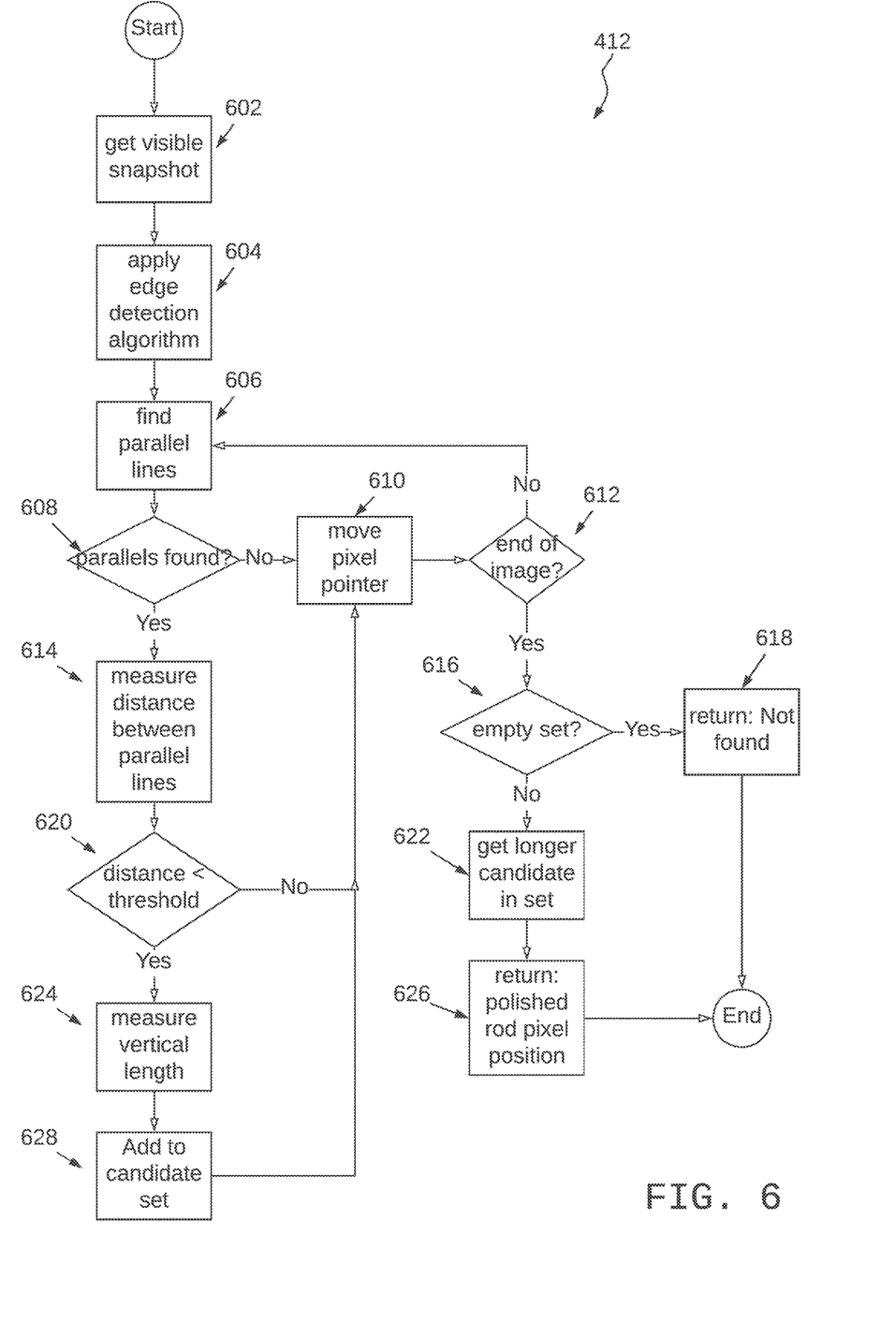
FIG. 6 illustrates a flow diagram for operation of a system for detecting the polished-rod in a visible image of a well head in a sucker rod pump according to an embodiment of the present invention.

Referring now to FIG. 6 illustrates a flow diagram 600 of the method in a preferred embodiment of the invention that describes the steps and decisions to accurately detect the polished rod 308. First a visible radiation image 602 is gathered and processed by applying an edge detection algorithm 604, the resulting image will have a multitude of vertical lines that will be analyzed by finding parallel vertical lines 606. Once a pair of lines is detected 608 another section of the software will measure the distance between a pair of parallel vertical lines 614, if this distance is less than a predefined threshold 620, the pair of lines will be measured vertically 624 and the pair of parallel lines will be added to a set of candidates 628 to be compared once all the possible candidates in the image have been identified. If there are not parallel lines found a pointer will be displaced horizontally 610 from left to right to a different part of the image until the end of the image is reached 612. Once the end is reached a comparison of the length of all the parallel line set 622 will yield the polished rod position 626. If the candidate set is empty, a negative response will be returned to the section of the software 618 indicating that no set of parallel lines that satisfies the preconditions has been found.

Figure 7:
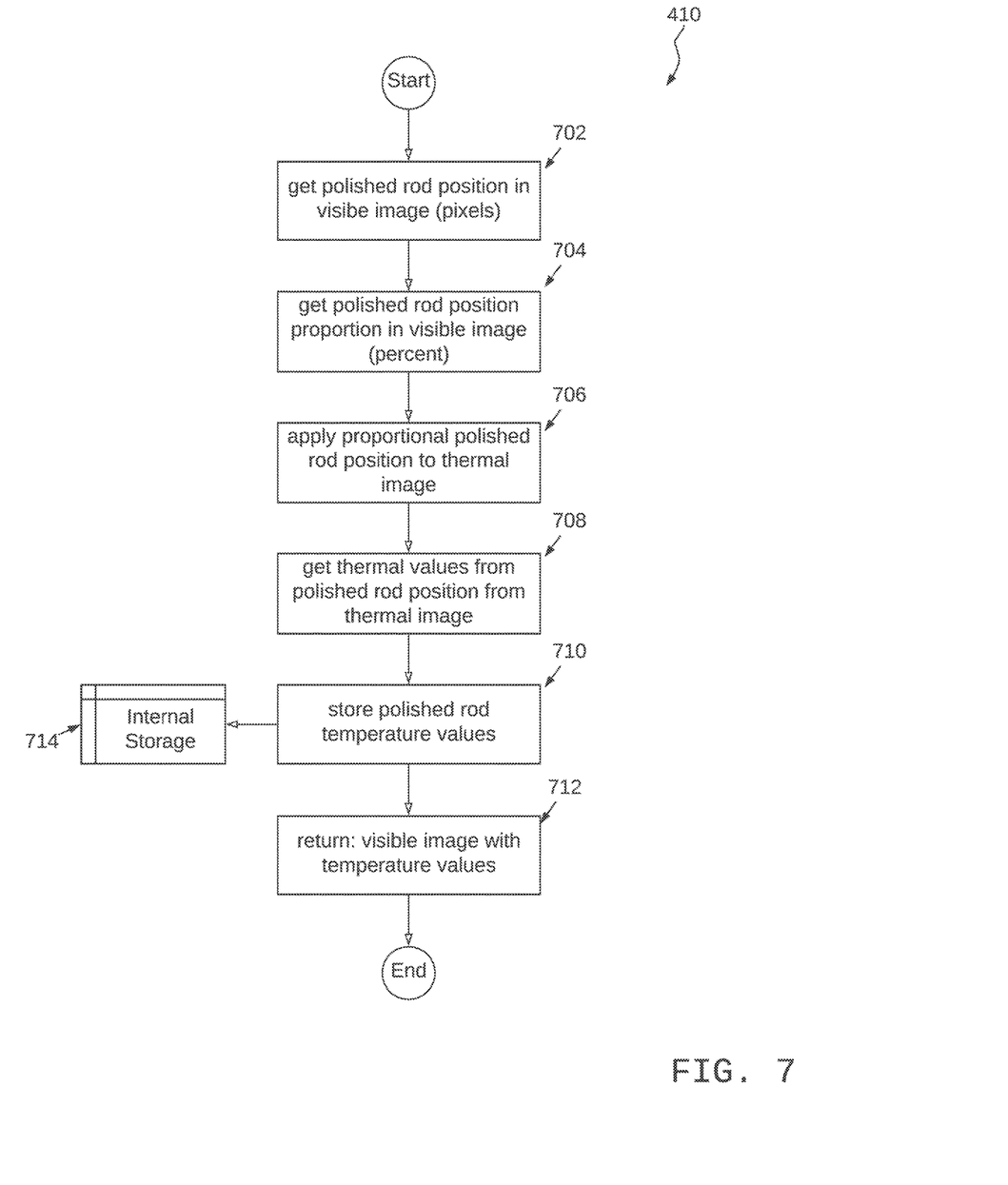
FIG. 7 illustrates a flow diagram for operation of a system for correlating a thermal and a visible light images to assign temperature values to a section previously identified as the polished-rod according to an embodiment of the present invention.

The present invention further provides a method for correlating the thermal and visible images. FIG. 7 illustrates a flow diagram of a section of the software 410 in a preferred embodiment of the invention that describes the steps and decisions to correlate the images acquired by the thermal image acquisition module 408 and the visible image acquisition module 406. Every iteration of this process start with getting the position of the polished rod 308 in the visible image 702. The result of this process is a position in pixels that has to be converted to a proportion 704, this proportion is then applied to the thermal image 706 to retrieve the temperature values of the section of interest out of the thermal image 708. The temperature values of the section of interest, as well as the visible image is time stamped and permanently stored into internal storage 714 for future reference. Finally this section of the software returns the visible image with the temperature values 712 of each section of the polished rod to be analyzed, stored, manipulated and shared by other sections of the software of the current invention.

Figure 8:
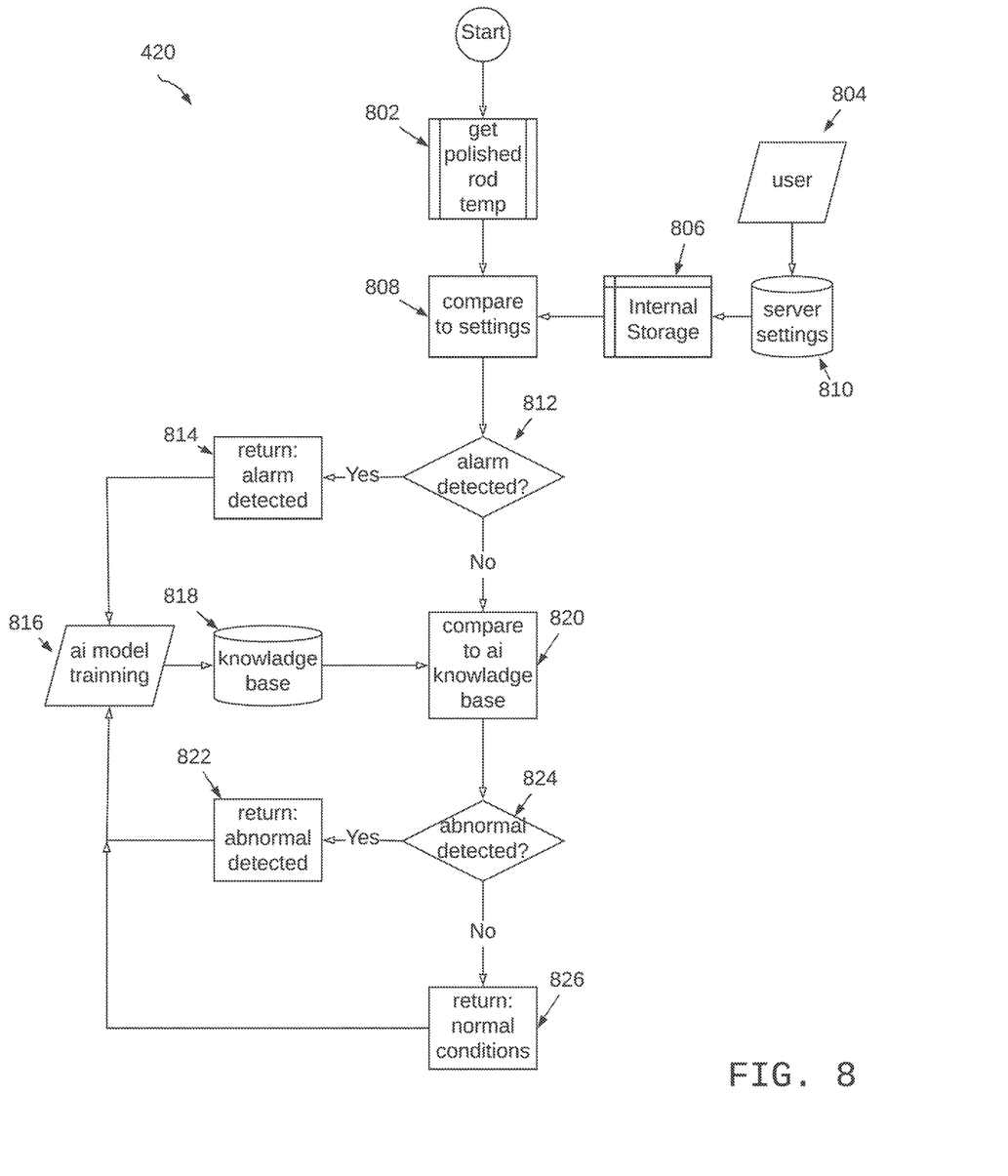
FIG. 8 illustrates a flow diagram for operation of a system for determining the pumping conditions of a sucker rod pump based on temperature readings of the polished-rod and compared to a set of predefined constants according to an embodiment of the present invention.

Referring now to FIG. 8 illustrates a flow diagram 420 of the section of the software in a preferred embodiment of the invention that describes the steps and decisions to accurately determine the current pumping conditions based on user 416 inputs and server 418 machine learning data. In order to be able to perform the current conditions determination this method need to have access to the visible image with temperature values 802 this data is transferred by the section of the software responsible of the correlation 410. With these information and the locally stored 806 settings provided by the user 804 via a server configuration 810, a comparison 808 to determine alarm conditions will be performed 812. If the result of the comparison is an alarm condition, this method will return an alarm to be analyzed, stored, manipulated and shared by other methods of the current invention. If no alarm condition is determined by this comparison another procedure will be performed to compare the current conditions to an artificial intelligence knowledge base 820 located in a remote server 418. This knowledge base 818 will be continuously fed by the results of a server based training model 816 comprising data from all the operational instances of the current invention. The result of the artificial intelligence comparison with the current pumping conditions 824 will determine if abnormal 822 or normal conditions 826 are detected. The results will be then returned to be analyzed, stored, manipulated and shared by other the section of software responsible for sending alarms to the user 422 and the section of software responsible for controlling the well 424 of the current invention.

CONCLUSION

The present apparatus, method and system has a number of advantages and benefits compared to certain devices and methods of the prior art. After the visible radiation sensor and thermal radiation sensor are mounted to the samson post, the apparatus of the present invention can accurately detect the temperature of the polished rod by correlating visible and thermal images. Further, the apparatus, system, and method of the present invention can determine pumping conditions based on the temperature of the different points on the polished rod. Yet further, without user intervention the pumping unit can be stopped and an alarm sent when unsafe pumping conditions are detected. Yet further, the apparatus provides for remote collection of historical and real time data through wireless communication, and for remote programming of the apparatus if desired.

The disclosed embodiments are illustrative, not restrictive. While specific configurations of the polished rod temperature detection have been described, it is understood that the present invention can be applied to a wide variety of contactless temperature sensing applications. There are many alternative ways of implementing the invention.

What is claimed is:

1. A device for detecting temperatures of different points of a rod on a well, the device comprising:
   a housing having a front end, a back end, and an interior cavity;
   a clamp to secure the housing to a post of the well;
   a thermal radiation sensor secured to the front end of the housing;
   a light visual radiation sensor secured to the front end of the housing, the light visual radiation sensor is vertically aligned with the thermal radiation sensor;
   a microcontroller system placed in the interior cavity of the housing, the microcontroller system includes a microcontroller, a non-volatile memory, and a serial interface in electronic communication;
   a position device secured to the housing, the position device includes electronics to infer the position of the device relative to a samson post, a wellhead, and the rod;
   a wireless device secured to the housing, the wireless device includes an antenna for a bi-directional wireless communication with a remote server;
   output device secured to the housing, the output device includes high current relays;
   wherein the microcontroller is in electronic communication with the serial interface for communicating with the visible radiation sensor, the thermal radiation sensor, the output module, the wireless module, and the position module;
   wherein the non-volatile memory contains a first section of a software that, when executed, instructs the microcontroller to collect a thermal image and a visible light image at the moment in which a pump jack is at a top of a pump cycle, then, the first software process horizontally correlates the thermal and visible light images and sends the processed data to a second section of the software that, when executed, compares different temperature values in different parts of the rod to a set of predefined constants and determines current pumping conditions to execute any appropriate control actions and alarm conditions, when the determination is concluded the data is sent to a third section of the software that stores relevant information in the non-volatile memory and sends said data through a wireless link to the remote server and/or a local wireless-equipped device.

2. The device according to claim 1, wherein the visible radiation sensor comprises a sensitive medium that converts radiation in a visible spectrum to an electronic signal proportional to a radiation level, wherein the electronic signal is then transformed to a map of radiation levels that is interpreted by the microcontroller.

3. The device according to claim 1, wherein the thermal radiation sensor comprises a sensitive medium that converts radiation in an infrared spectrum to an electronic signal proportional to a radiation level, wherein the electronic signal is transformed to a map of radiation levels that can be interpreted by the microcontroller.

4. The device according to claim 1, wherein the light visual radiation sensor and the thermal radiation sensor are horizontally aligned to a central point on the rod to allow correlation of images acquired to be performed using the central point as a reference for the correlation.

5. A method for detecting temperatures and positions of a rod on a wellhead to prevent failures, the method comprising the steps of:
   a) providing a device comprising: a housing having a front end, a back end, and an interior cavity; a clamp to secure the housing to a post of the well; a thermal radiation sensor secured to the front end of the housing; a light visual radiation sensor secured to the front end of the housing, the light visual radiation sensor is vertically aligned with the thermal radiation sensor; a microcontroller system placed in the interior cavity of the housing, the microcontroller system includes a microcontroller, a non-volatile memory, and a serial interface in electronic communication; a position device placed attached to the housing, the position device includes electronics to infer the position of the device relative to a samson post, a wellhead, and the rod; a wireless device attached to the housing, the wireless device includes an antenna for a bi-directional wireless communication with a remote server; output device attached to the housing, the output device includes high current relays; wherein the microcontroller is in electronic communication with the serial interface for communicating with the visible radiation sensor, the thermal radiation sensor, the output module, the wireless module, and the position module, wherein the light visual radiation sensor and the thermal radiation sensor are horizontally aligned to a central point on the rod to allow correlation of images acquired to be performed using the central point as a reference for the correlation;
   b) capturing a thermal image of the rod of the wellhead by using the thermal radiation sensor, wherein the non-volatile memory contains a first section of a software that, when executed, instructs the microcontroller to collect the thermal image at the moment in which a pump jack is at a top of a pump cycle;
   c) capturing a vertical position image of the rod of the wellhead by using the light visual radiation sensor, wherein the first section of the software, when executed, instructs the microcontroller to collect the vertical position image at the moment in which the pump jack is at the top of the pump cycle;
   d) transferring the thermal image and the vertical position image to the microcontroller;

e) using a first section of a software to horizontally correlate the thermal image and the vertical position image based on the central point to detect a position of the wellhead, then sending the correlation to a second section of the software;
f) using the second section of the software to compare the different temperature values in different parts of the rod to a set of predefined constants;
(g) determining a pumping condition based on the comparing step;
(h) sending a signal to the output module to emit an alarm if the pumping conditions are outside a required range to turn off the pump and sending the data through a wireless link to the remote server and/or a local wireless-equipped device.

6. The method according to claim 5, wherein in the step of capturing the vertical position image further includes:
applying an edge detection algorithm to the vertical position image to produce a resulting image having a multitude of vertical lines;
finding parallel vertical lines in the resulting image;
measuring a distance between a set two of the parallel vertical lines;
comparing the distance with a pre-set distance;
repeating the previous steps with another set of two parallel vertical lines until all set of two vertical parallel lines have been compared;
determining the position of the rod by comparing the distances on each set of set of two parallel vertical lines.

7. The method according to claim 5, wherein the step of correlating the thermal image and the vertical position image further includes:
getting the position of the rod in the visible radiation image, the position is obtained in pixels;
creating with the pixels a proportion;
applying the proportion to the thermal radiation image to obtain temperatures values for a region of interest; and
assigning the temperature values to the corresponding area in the visible radiation image.

* * * * *